(12) United States Patent
Dötsch et al.

(10) Patent No.: US 7,158,496 B2
(45) Date of Patent: Jan. 2, 2007

(54) METHOD AND DEVICE FOR PROCESSING A DIGITAL DATA SIGNAL IN A CDMA RADIO TRANSMITTER

(75) Inventors: Markus Dötsch, Schliern (CH); Peter Jung, Otterberg (DE); Jörg Plechinger, München (DE); Peter Schmidt, Ellerstadt (DE); Michael Schneider, München (DE); Tideya Kella, München (DE)

(73) Assignee: Infineon Technologies, AG, Munich (DE)

( * ) Notice: Subject to any disclaimer, the term of this patent is extended or adjusted under 35 U.S.C. 154(b) by 986 days.

(21) Appl. No.: 10/158,273

(22) Filed: May 30, 2002

(65) Prior Publication Data

US 2002/0172182 A1 Nov. 21, 2002

Related U.S. Application Data

(63) Continuation of application No. PCT/DE00/04236, filed on Nov. 27, 2000.

(30) Foreign Application Priority Data

Nov. 30, 1999 (DE) ................. 199 57 535

(51) Int. Cl.
- *H04Q 7/00* (2006.01)
- *H04B 7/216* (2006.01)
- *H04J 4/00* (2006.01)

(52) U.S. Cl. ............ 370/330; 370/335; 370/436; 370/441

(58) Field of Classification Search ......... 370/330, 370/335–337, 342–345, 347, 436, 441, 442, 370/478–481, 498

See application file for complete search history.

(56) References Cited

U.S. PATENT DOCUMENTS

| 5,369,664 | A | 11/1994 | Takahashi et al. |
| 5,748,623 | A | 5/1998 | Sawahashi et al. |
| 6,018,528 | A * | 1/2000 | Gitlin et al. ............ 370/436 |
| 6,351,458 | B1 * | 2/2002 | Miya et al. ............. 370/330 |
| 6,611,509 | B1 * | 8/2003 | Hayashi et al. ......... 370/335 |
| 6,781,975 | B1 * | 8/2004 | Baier et al. ............ 370/335 |

FOREIGN PATENT DOCUMENTS

| DE | 195 49 148 A1 | 7/1997 |
| EP | 0 809 364 A2 | 11/1997 |
| EP | 0 876 008 A1 | 11/1998 |
| WO | WO 96/19883 | 6/1996 |

OTHER PUBLICATIONS

Woodworth, C. et al.: "Spectrally Efficient Universal Time Slots Using Time-Frequency-Code Slicing", IEEE, 1994, pp. 1009-1013.

(Continued)

*Primary Examiner*—Chau Nguyen
*Assistant Examiner*—Kerri M. Rose
(74) *Attorney, Agent, or Firm*—Laurence A. Greenberg; Werner H. Stemer; Ralph H. Locher

(57) ABSTRACT

A digital data signal to be transmitted is split into a number of subsidiary data signals by a data signal splitting device and is output by a timeslot data output device in a particular timeslot of a TDMA frame made up of a plurality of timeslots. A channeling device is used to impress a CDMA code onto each subsidiary data signal which is output in the particular timeslot. A device for processing a digital data signal in a CDMA mobile radio transmitter is also provided.

10 Claims, 3 Drawing Sheets

OTHER PUBLICATIONS

He, J. et al.: "A MAC Protocol Supporting Wireless Video Transmission Over Multi-Code CDMA Personal Communication Networks", Elsevier Science B. V., 1998, pp. 1256-1268.

Nikula, E. et al.: "Frames Multiple Access for UMTS and IMT-2000", IEEE, Apr. 1998, pp. 16-24.

* cited by examiner

METHOD AND DEVICE FOR PROCESSING A DIGITAL DATA SIGNAL IN A CDMA RADIO TRANSMITTER

CROSS-REFERENCE TO RELATED APPLICATION

This application is a continuation of copending International Application No. PCT/DE00/04236, filed Nov. 27, 2000, which designated the United States and was not published in English.

BACKGROUND OF THE INVENTION

Field of the Invention

The invention relates to a method and a device for processing a digital data signal in a CDMA (Code Division Multiple Access) radio transmitter.

First-generation cellular mobile radio systems, such as AMPS (Advanced Mobile Phone Service), NMP (Nordic Mobile Telephone), TACS (Total Access Communication System) or the C-network, were able to transmit voice at a data rate of no more than 2 kbit/s and were in use up until about 1992. Second-generation mobile radio systems, for example the Pan-European GSM (Global System for Mobile Communications) allow voice and data to be transmitted at a data rate of approximately 10 kbit/s. Worldwide development is currently in progress for radio transmitters/receivers for third-generation mobile radio systems, in particular for UMTS (Universal Mobile Telecommunication System). Third-generation mobile radio systems are intended to transmit multimedia (i.e. voice/data/video) at a maximum data rate of approximately 2 Mbit/s, which is significantly increased as compared with the second generation.

Such high data rates in the Mbit/s range are not needed constantly, however, but rather only intermittently (e.g. when simultaneously transmitting a plurality of services or for video). For the UMTS, it is therefore desirable to be able to manage and allocate transmission capacity flexibly and according to need.

Third-generation mobile radio systems use code-division multiplex (CDMA) as a multiple access method. In CDMA, the data signal to be transmitted for each subscriber is coded using a subscriber-specific CDMA code. The different coding allows subscriber separation.

Other known multiple access methods are time-division multiplex (TDMA: Time Division Multiple Access) and frequency-division multiplex (FDMA: Frequency Division Multiple Access).

In the TDMA method, the transmission time is divided into consecutive TDMA frames, and each subscriber is allocated a particular subinterval (timeslot) in the TDMA frame. A drawback is that each subscriber has only a little transmission time available (namely one timeslot per TDMA frame), and hence only a relatively low data rate (based on the total transmission time).

In the FDMA method, the total transmission bandwidth is classified into disjunct subscriber frequency bands, and each subscriber is allocated a particular frequency band on a permanent basis. A drawback is the FDMA method's low level of flexibility on account of the permanent frequency band/subscriber allocation.

The article "A MAC-protocol supporting wireless video transmission over multi-code CDMA personal communication networks", He J. et al., Computer Communications, Volume 21, pages 1256 to 1268, 1998 describes a method in which a signal is split into a plurality of subsidiary data signals, and the subsidiary data signals are then coded using different CDMA codes.

SUMMARY OF THE INVENTION

It is accordingly an object of the invention to provide a method and a device for processing a digital data signal in a CDMA radio transmitter which overcome the above-mentioned disadvantages of the heretofore-known methods and devices of this general type and which allow a digital data signal, which is to be transmitted, to be processed in a CDMA mobile radio transmitter in a manner which is flexible in relation to the needed data rate required for transmission.

With the foregoing and other objects in view there is provided, in accordance with the invention, a method of processing a digital data signal in a CDMA mobile radio transmitter, the method includes the steps of:

splitting a data signal to be transmitted into a given number M of subsidiary data signals by using a data signal splitting device, M being an integer number having a value of at least 2;

outputting the subsidiary data signals in a given timeslot of a TDMA frame made up of a plurality of timeslots by using a timeslot data output device;

impressing a CDMA code onto each of the subsidiary data signals output in the given timeslot of the TDMA frame by using a channeling device; and transmitting at least two of the M subsidiary data signals in different frequency ranges by multiplying a narrowband frequency shift sequence onto at least one of the M subsidiary data signals.

Accordingly, the digital data signal to be transmitted is subjected to a combined TDMA/CDMA processing method. In this case, the splitting of the data signal to be transmitted into M subsidiary signals allows the data to be processed according to need (i.e. taking into account the source's currently required data rate), because transmitting an increased data rate requires only an increase in the number M of subsidiary data signals, i.e. the addition of supplementary "channels". In addition, at least two of the M subsidiary data signals are transmitted in different frequency ranges. These two subsidiary data signals can then also have identical CDMA codes impressed onto them, since it is possible to distinguish the two subsidiary data signals in the frequency range. Such channels (frequency channels) are also referred to as "physical" channels below.

Preferably, different CDMA codes are impressed onto the M subsidiary data signals in a paired manner. The subsidiary data signals can then be clearly distinguished from one another (i.e. separated in the receiver by decoding the CDMA codes) merely on the basis of the impressed different CDMA codes. In other words, in this case, the CDMA coding achieves not "only" subscriber separation but also channel separation. Channels produced by CDMA coding are also referred to as "logical" channels below.

Expediently, each subsidiary data signal is multiplied by a weighting factor which can be different for each TDMA frame. By choosing a suitable weighting factor for each frame, it is possible to compensate for changes in the transmission channel over time (particularly in its varying attenuation over time).

In the event of an increase in the number M of subsidiary data signals, a CDMA code which has a minimal correlation to the CDMA codes used in a particular timeslot and frequency range for all the transmitting subscribers (in a radio cell) is preferably impressed onto a subsidiary data signal which is being added. The effect achieved by this is that the added subsidiary data signal is coded using that CDMA code still free which permits the most accurate reconstruction of the transmitted subsidiary data signal during decoding in the receiver.

With the objects of the invention in view there is also provided, a device for processing a digital data signal in a CDMA mobile radio transmitter, the device including:

a data signal splitting device for splitting a data signal to be transmitted into a given number M of subsidiary data signals, M being an integer number having a value of at least 2;

a timeslot data output device operatively connected to the data signal splitting device, the timeslot data output device outputting the subsidiary data signals in a given one of a plurality of timeslots of a TDMA frame; and a channeling device operatively connected to the timeslot data output device, the channeling device including a first set of multipliers and a second set of multipliers, the first set of multipliers multiplying a CDMA code onto each of the subsidiary data signals output in the given one of the plurality of timeslots, the second set of multipliers multiplying a narrowband frequency shift sequence onto at least one of the subsidiary data signals.

According to another feature of the invention, the channeling device multiplies different CDMA codes onto respective pairs of the M subsidiary data signals.

According to yet another feature of the invention, the data signal splitting device, the timeslot data output device and the channeling device define a signal path; and a weighting device is provided in the signal path downstream of the data signal splitting device, the weighting device multiplies each of a plurality of data symbols of one of the subsidiary data signals by a weighting factor.

According to a further feature of the invention, the weighting device selects a weighting factor based on a TDMA frame structure.

Corresponding to the method according to the invention, the device according to the invention is in the form of a multichannel system (M>2), which—as already explained—allows transmission capacity to be provided according to need and flexibly by adding further channels as soon as a higher transmission capacity is required.

Other features which are considered as characteristic for the invention are set forth in the appended claims.

Although the invention is illustrated and described herein as embodied in a method and a device for processing a digital data signal in a CDMA radio transmitter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
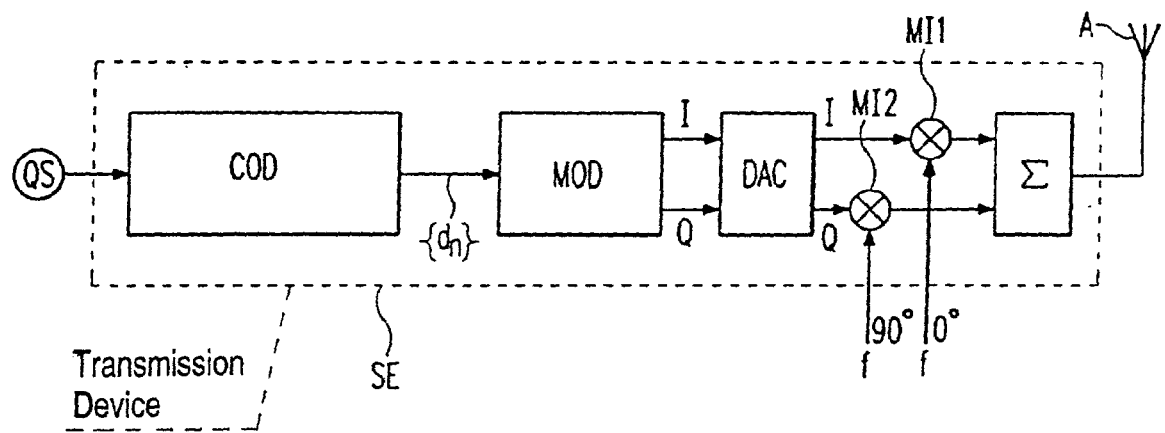
FIG. 1 is a block diagram of a mobile radio transmitter including a modulator device in accordance with the invention for illustrating the signal processing in a mobile radio transmitter.

Referring now to the figures of the drawings in detail and first, particularly, to FIG. 1 thereof, there is shown the basic structure of a transmission device SE in a radio transmitter as used in a base station or a mobile station in a mobile radio system.

The transmission device SE receives an analog source signal QS (for example produced by a microphone or video camera) and supplies it to a coder COD. The coder COD includes an analog/digital converter for digitizing the source signal QS and can also contain a source coder, a channel coder and an interleaver which suitably perform a source-coding, provide error-protection coding for the digitized source signal QS and interleave the digitized source signal QS.

The coder COD outputs a binary data signal to be transmitted which includes a data sequence $\{d_n\}$ containing the data symbols $d_0$, $d_1$, . . . . The data symbols $d_0$, $d_1$, . . . can be taken from the set of values $\{-1, 1\}$, for example.

The data sequence $\{d_n\}$ is supplied to a modulator device MOD which—as will be explained in more detail below—spread-codes each data symbol using a subscriber-specific CDMA code and spectrally shapes (i.e. modulates) the data sequence for emission using a radio-frequency carrier.

In addition, the modulator device MOD splits, i.e. divides, the data signal into an in-phase (I) branch and a quadrature (Q) branch. The I and Q signal components which are output by the modulator device MOD are supplied to a digital/analog converter DAC, which produces corresponding analog I and Q signal components. These components are respectively up-converted with a 90° phase shift with respect to one another in mixing stages MI1 and MI2 using a radio-frequency carrier of a frequency f, are superimposed and are emitted as a radio signal via an antenna A.

Figure 2:
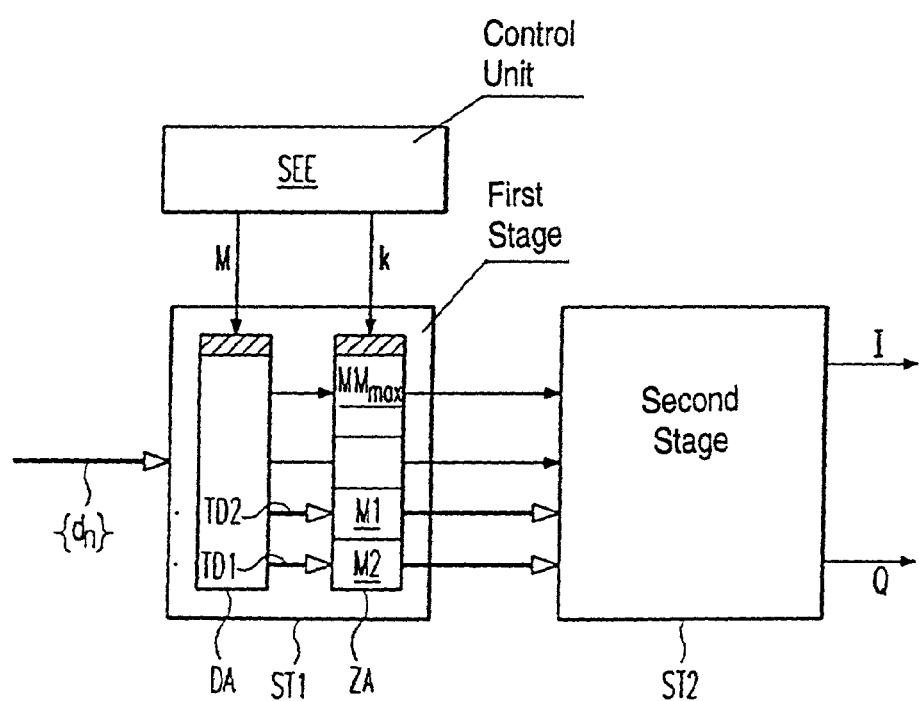
FIG. 2 is a block diagram of the modulator device shown in FIG. 1.

FIG. 2 explains the data processing procedures implemented in the modulator device MOD.

Figure 3:
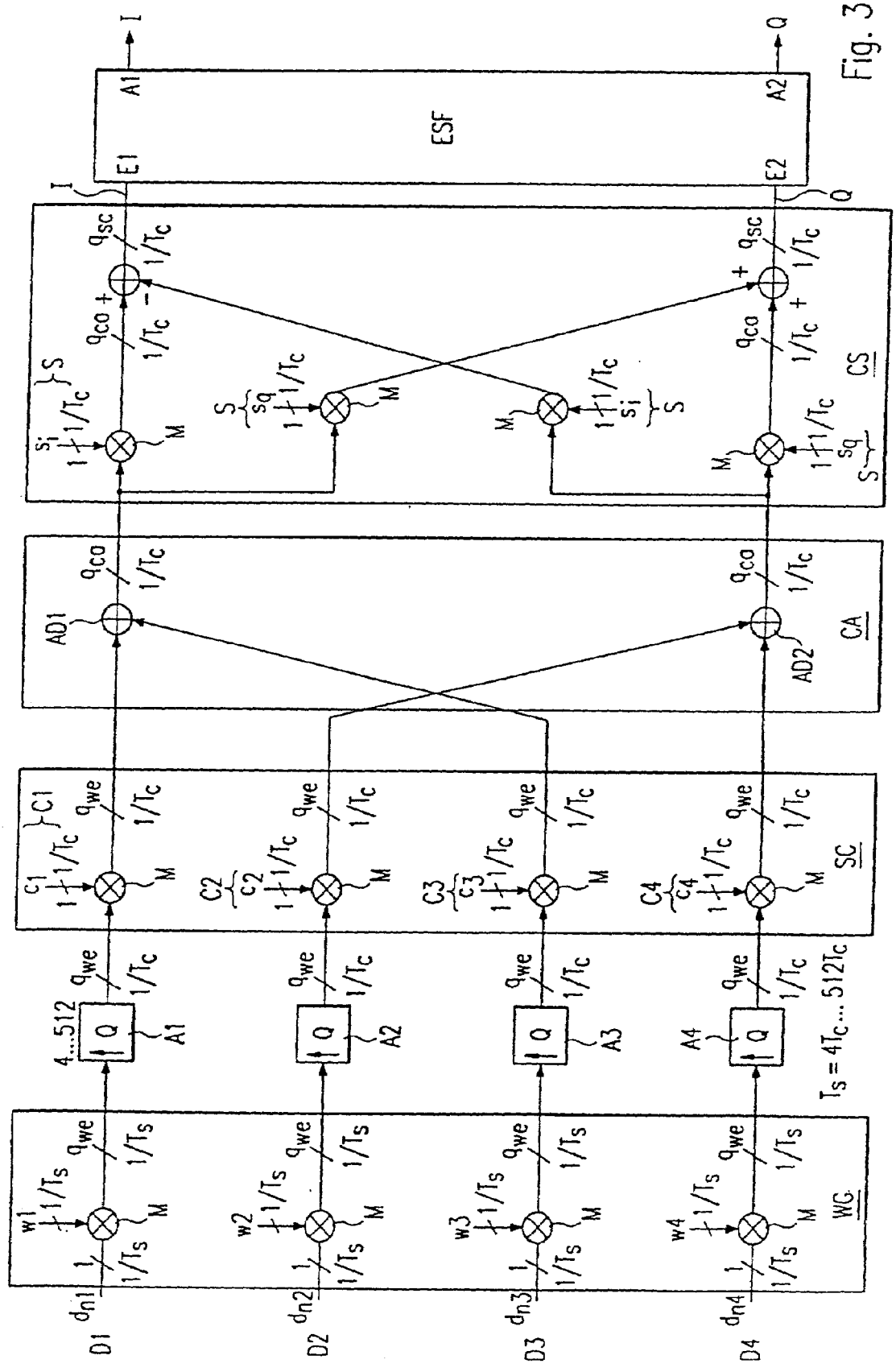
FIG. 3 is a block circuit diagram of the CDMA stage shown in FIG. 2 for a maximum of four logical channels.

The modulator device MOD includes a first stage ST1 (also referred to as TDMA stage below) and a second stage ST2 (also referred to as CDMA stage below), the latter being explained in even more detail in FIG. 3.

The TDMA stage ST1 includes a data signal splitting device DA and a timeslot data output device ZA.

The data signal splitting device DA receives the digital data signal to be transmitted in the form of the data sequence $\{d_n\}$ and splits the data signal into M different subsidiary data signals TD1, TD2 (M=2 in the example shown). To this end, the data signal splitting device DA is informed by a control unit SEE of the number M of subsidiary data signals (channels) required.

The number M is dependent on the data rate of the data signal to be transmitted. The higher the rate of the data signal, the more subsidiary data signals need to be added, i.e. the higher the number chosen for M. The data signal splitting device DA can produce, by way of example, a maximum of 16 subsidiary data signals, i.e. $M_{max}$=16 (in FIG. 2, only $M_{max}$=4 maximum subsidiary data signals which can be produced are shown, for reasons of simpler explanation and illustration).

The M=2 subsidiary data signals TD1, TD2 are supplied to the timeslot data output device ZA. The timeslot data output device ZA includes $M_{max}$ buffers M1, M2, ... $MM_{max}$. Each buffer M1, M2, ..., $MM_{max}$ receives precisely one subsidiary data signal TD1, TD2, ... and temporarily stores the respective data symbols obtained.

The stored data symbols for the subsidiary data signals TD1, TD2 are output simultaneously during a particular timeslot, indexed by the integer k, of a TDMA frame. To this end, the timeslot data output device ZA is informed by the control unit SEE of the index k for this particular timeslot. By way of example, k=4 signifies that the data are output in the 4th timeslot of the currently available TDMA frame (which contains 16 timeslots, for example). The timing structure of the data signals appearing in the signal path downstream of the timeslot data output device ZA is explained in even more detail with reference to FIG. 4A.

The data signal splitting device DA can, by way of example, be a demultiplexer with variable demultiplexing depth M. The buffers M1, M2, ..., $M_{max}$ in the timeslot data output device ZA can be produced by FIFO memories. The timeslot data output device ZA can also be provided upstream of the data signal splitting device DA in the signal path.

As a result, the stage ST1 provides the subsequent second stage ST2 with a variable number of M subsidiary data signals in a particular timeslot k of a TDMA frame structure. In the remaining time (i.e. outside the period of the k-th timeslot), the second stage ST2 has been deactivated by the first stage ST1.

The second stage ST2 (CDMA stage) is explained in more detail with reference to FIG. 3.

The second stage ST2 has four (universally: $M_{max}$) data inputs D1, D2, D3 and D4 and is thus suitable for simultaneously setting up a maximum of four (universally: $M_{max}$) channels.

The subsidiary data signals TD1, TD2 applied to the data inputs D1, D2, D3 and D4 and, if available (i.e. in the case M=$M_{max}$), TD3 and TD4 are represented by the binary data sequences $\{d_{n1}\}$, $\{d_{n2}\}$, $\{d_{n3}\}$ and $\{d_{n4}\}$ having the data symbol rate 1/$T_s$. In this case, $T_s$ denotes the period of time for a single data symbol $d_{n1}$ (or $d_{n2}$, $d_{n3}$, $d_{n4}$).

In an (optional) weighting unit WG, the data symbols are weighted by multiplying them by weighting factors w1, w2, w3 and w4 at the data symbol clock rate. To this end, the weighting unit WG has four multipliers M which multiply the data symbols $d_{n1}$ by the weighting factor w1, multiply the data symbols $d_{n2}$ by the weighting factor w2, etc. Data signals available at the output of the weighting unit WG have a word length of $q_{we}$>1. Their signal rate is still 1/$T_s$.

The weighting factors w1, w2, w3, w4 permit level matching for the transmitted signal, i.e. they can be regarded as "volume factors". In practice, the channels are frequently operated at the same "volume" w (w=w1=w2=w3=w4), but with the "volume" w being varied over time, i.e. w is readjusted for each TDMA frame, for example. This makes it possible to allow for variable attenuation in the transmission channel over time.

In addition, the use of weighting factors w1, w2, w3, w4 which are different from channel to channel makes it possible to compensate for different channel energies arising, by way of example, when using spreading factors Q which are different from channel to channel.

The weighted data sequences $\{d_{n1}\}$, $\{d_{n2}\}$, $\{d_{n3}\}$ and $\{d_{n4}\}$ are sampled by sampling stages A1, A2, A3, A4 using oversampling (oversampling factor Q). This increases the signal rate in each signal path from 1/$T_s$ to 1/$T_c$, where $T_c$ denotes the chip time period which is the time base for the subsequent CDMA spread-coding. It holds that $T_s/T_c$=Q. The oversampling factor Q is therefore also referred to as spreading factor Q. It can differ from channel to channel and can be between 4 and 512, i.e. $T_s$=4$T_c$ ... 512$T_c$.

In a UMTS transmission device of the third mobile radio generation, the signal rate 1/$T_c$ at the output of the sampling stages A1, A2, A3, A4 is 3.84×10$^6$ samples per second.

The data symbols $d_{n1}$, $d_{n2}$, $d_{n3}$, $d_{n4}$ with an oversampling factor of Q are then spread-coded in the spread coder SC by impressing subscriber-specific and channel-specific digital spreading code sequences. A multiplier M is used to multiply a first spreading code sequence C1 including Q digital chips $c_1$ onto each data symbol $d_{n1}$ supplied by the first data input D1. A corresponding procedure is used for the data symbols $d_{n2}$, $d_{n3}$, $d_{n4}$ supplied by the other data inputs D2, D3, D4. By impressing the spreading code sequences C1, C2, C3, C4, each data symbol $d_{n1}$, $d_{n2}$, $d_{n3}$, $d_{n4}$ is provided, as it were, with a "fingerprint" of both the transmitting subscriber and the corresponding channel. The output of the spread coder SC provides the spread-coded subsidiary data signals having a signal rate of 1/$T_c$—i.e. the chip rate—and an (unchanged) word length of $q_{we}$.

Channels "produced" (i.e. rendered distinguishable) by CDMA coding are referred to as logical channels, as already mentioned.

Optionally, instead of one or more logical channels, physical channels can also be used. By way of example, it will be assumed that the CDMA code sequences C1 and C2 are identical. In this case, spread-coding still allows subscriber separation. Channel separation is no longer possible, however. This can be achieved, however, by virtue of there being a further, optional stage, whose configuration is identical to that of the spread coder SC, integrated downstream of the sampling stages A1, A2, A3, A4 and upstream of the channel adder CA, which is yet to be explained. The multipliers in this stage are used to multiply a respective narrowband frequency shift sequence F1 or F2 onto the subsidiary data signals (in the example described, from the data inputs D1 and D2). The frequency shift sequences F1 and F2 cause the subsidiary data signals from the data inputs D1 and D2 to be in a different frequency range during the subsequent emission and hence allow them to be separated from one another in a receiver. In other words, subscriber separation is (still) ensured by a CDMA component in this case, while channel separation (at least for two channels, in this case D1, D2) is achieved by an FDMA component (i.e. production of physical channels).

The signal path downstream of the spread coder SC contains a channel adder CA. The channel adder CA includes two adders AD1, AD2 operating at the chip clock rate. The adder AD1 adds the subsidiary data signals coming from the data inputs D1, D3, and the adder AD2 adds the subsidiary data signals coming from the data inputs D2 and D4. The two outputs of the channel adder CA produce data signals having a signal rate of 1/$T_c$ and a possibly increased word length of $q_{ca}$.

With more than $M_{max}$=4 channels, the channel adder CA needs to have correspondingly more adding inputs.

A complex scrambler CS is used for impressing a complex-value scrambling code sequence S onto the data signals. To this end, the data signals which are output by the channel adder CA are multiplied, in the manner shown, by the real and imaginary parts $s_q$ and $s_i$ of the elements of the complex-value scrambling code sequence S and are subsequently added crosswise as shown. The scrambling code sequence S is a base station identifier. If the transmission device SE is in a base station, then the scrambling code sequence S denotes this base station. Otherwise (transmission device SE is in the mobile station) the scrambling code sequence S denotes the receiving base station.

The complex scrambler CS is also used for producing the I and Q signal components of the transmitted signal, which are available at the output of the complex scrambler CS with a signal rate of $1/T_c$ and a word length of $q_{sc}$.

These two signal components are supplied to the inputs E1, E2 of a device for spectral signal shaping ESF. The outputs A1, A2 of the device for spectral signal shaping ESF provide spectrally shaped (i.e. modulated) I and Q signal components having a quadrupled signal rate.

The device for spectral signal shaping ESF is essentially a digital filter, and the spectral filter function used for signal shaping can, by way of example, be an RRC (root raised cosine) function. Such a filter circuit is referred to as an RRC filter circuit. The RRC function is defined by the functional relationship $(1+\cos x)^{1/2}/2^{1/2}$ in the range $0 < x < \pi$, which reproduces the profile of the filter edge in the spectral range.

The device for spectral signal shaping ESF can have a frequency correction device (not shown) connected downstream of it. The configuration of the frequency correction device is identical to that of the complex scrambler CS and differs therefrom only in that, instead of the real-value and imaginary-value elements $s_q$ and $s_i$ of the complex-value scrambling code sequence S, the real-value and imaginary-value elements of a frequency correction sequence F (for a quadrupled signal rate) are multiplied onto the I and Q branches. The frequency correction sequence F is used to effect a specific spectral shift in the digital transmitted signal in order to compensate for unwanted frequency detuning between receiver and transmitter (for example on account of oscillator drifts, Doppler effects, etc.).

Figure 4A:
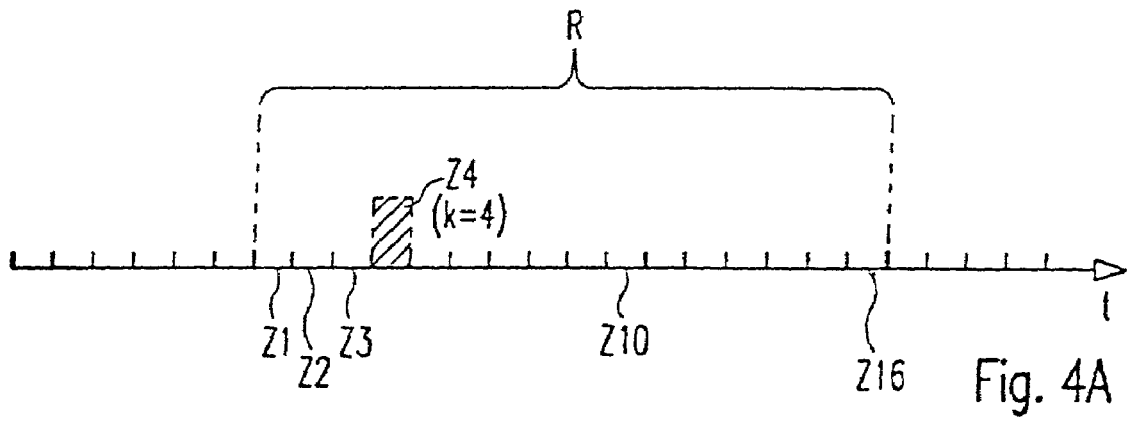
FIG. 4A is a schematic illustration for explaining the frame and timeslot structure for the TDMA multiple access component.

FIG. 4A shows the timing structure of all the data signals in the signal path downstream of the first stage ST1 over the transmission time t. The transmission time t is divided into consecutive, disjunct TDMA frames, of which one TDMA frame R is shown in FIG. 4A. Each TDMA frame R is in turn divided into 16 consecutive, disjunct timeslots Z1, Z2, ..., Z16.

In the example shown in FIG. 4A, k=4. This means that the transmission device SE under consideration is active in the fourth timeslot Z4 of the TDMA frame R.

In the case of circuit-switched services, k is constant, i.e. the transmission device SE always uses the same active timeslot in consecutive TDMA frames R. This is not necessarily the case with packet-switched services, however, i.e. the active timeslot k can vary from one TDMA frame R to the other. The timeslots Z1, Z2, ..., Z16 do not need to be contiguous, but rather can be separated in time by dead times.

Figure 4B:
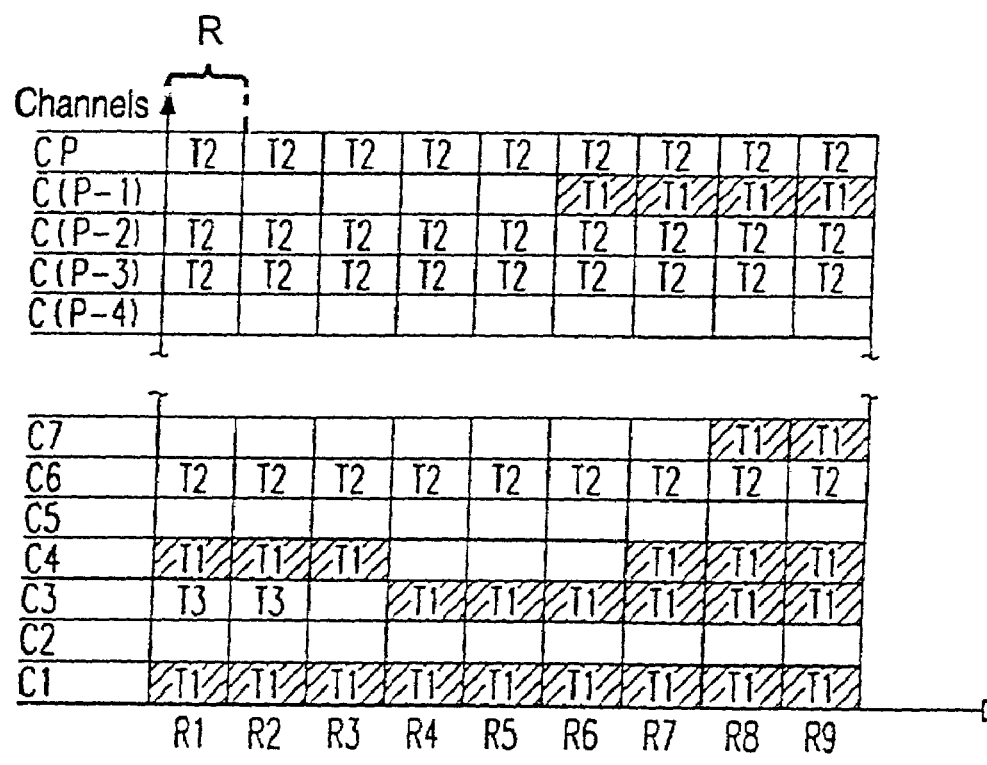
FIG. 4B is a schematic illustration of the use of the available CDMA codes in a radio cell in order to explain the channel addition in the method according to the invention.

FIG. 4B shows a schematic illustration to explain the way in which the inventive transmission device SE works. The logical channels available in a radio cell are plotted over the transmission time t. The total number P of logical channels is equal to the number of CDMA codes C1, C2, ..., CP available overall. The CDMA codes C1, C2, ..., CP defined in UMTS are also referred to as OVSF (Orthogonal Variable Spreading Factor) codes on account of their variable spreading factor.

It will be assumed below that the subscriber T1 is the user of the transmission device SE described above, which is active in the k-th timeslot of a frame. In a first TDMA frame R1, the subscriber T1 uses the CDMA codes C1 and C4, a subscriber T2 active in the same timeslot uses the CDMA codes C6, C(P-3) C(P-2) and CP, and a third subscriber T3, likewise active in the same timeslot, uses the CDMA code C3. In FIG. 4B, the code use of the subscriber T1 is additionally illustrated by shading.

The use of the available CDMA codes in a radio cell by the active subscribers T1, T2, T3 and also M and k for each subscriber are known at any time to the base station monitoring the radio cell. In practice, the allocation of the individual CDMA codes is negotiated between the base station and the active subscribers T1, T2, T3 (mobile stations).

The code use in the TDMA frame R2 is identical to the code use in the preceding TDMA frame R1.

In the k-th timeslot under consideration in the TDMA frame R3, the subscriber T3 is no longer represented, i.e. the CDMA code C3 has become free.

In the event of a change in the code use, it may be advantageous to redistribute the used/free CDMA codes C1, C2, ... CP for reasons of improved channel separation capability. For this reason, the subscriber T1 changes from the CDMA code C4 to the CDMA code C3 (see TDMA frames R4 and R5).

At the end of the TDMA frame R5, the subscriber T1 requires a higher transmission capacity, for example because an additional service needs to be transmitted. In agreement with the base station, the subscriber T1 is first allocated the additional channel C(P-1) for this purpose (see TDMA frame R6), and the other channels C4 and C7 are allocated to the subscriber T1 in the next frames R7 and R8. The added channels C(P-1), C4, C7 can be selected, in consultation with the base station, such that optimum subscriber and channel separation is made possible within the k-th timeslot under consideration here, i.e. such that the CDMA codes used are selected taking into account their different spectral characteristics.

The channel use in the TDMA frame R9 is identical to the channel use in R8.

Instead of the addition of logical channels explained with reference to FIG. 4B when the transmission rate requirement increases, it is also possible to provide for addition of physical channels using the frequency shift sequences F1, F2 explained above.

We claim:

1. A method of processing a digital data signal in a CDMA mobile radio transmitter, the method which comprises:
   splitting a data signal to be transmitted into a given number M of subsidiary data signals by using a data signal splitting device, M being an integer number having a value of at least 2, the data signal being transmitted in the form of one data sequence;
   outputting the subsidiary data signals in a given timeslot of a TDMA frame made up of a plurality of timeslots by using a timeslot data output device;
   impressing a CDMA code onto each of the subsidiary data signals output in the given timeslot of the TDMA frame by using a channeling device; and
   transmitting at least two of the M subsidiary data signals in different frequency ranges by multiplying a narrowband frequency shift sequence onto at least one of the M subsidiary data signals.

2. The method according to claim 1, which comprises impressing different CDMA codes onto respective pairs of the M subsidiary data signals.

3. The method according to claim 1, which comprises multiplying each of the M subsidiary data signals by a weighting factor.

4. The method according to claim 1, which comprises multiplying each of the M subsidiary data signals by a weighting factor, the weighting factor being different for at least some of a plurality of TDMA frames.

5. The method according to claim 1, which comprises multiplying each of the M subsidiary data signals by a weighting factor, the weighting factor being different for each of a plurality of TDMA frames.

6. The method according to claim 1, which comprises:
providing a given CDMA code having a minimal correlation to CDMA codes used in the given timeslot and a frequency range of all transmitting subscribers; and
impressing the given CDMA code onto an additional subsidiary data signal when increasing the given number M.

7. In a CDMA mobile radio transmitter, a device for processing a digital data signal, comprising:
a data signal splitting device for splitting a data signal to be transmitted into a given number M of subsidiary data signals, M being an integer number having a value of at least 2, said data signal being transmitted in the form of one data sequence;
a timeslot data output device operatively connected to said data signal splitting device, said timeslot data output device outputting the subsidiary data signals in a given one of a plurality of timeslots of a TDMA frame; and
a channeling device operatively connected to said timeslot data output device, said channeling device including a first set of multipliers and a second set of multipliers, said first set of multipliers multiplying a CDMA code onto each of the subsidiary data signals output in the given one of the plurality of timeslots, said second set of multipliers multiplying a narrowband frequency shift sequence onto at least one of the subsidiary data signals.

8. The device according to claim 7, wherein said channeling device multiplies different CDMA codes onto respective pairs of the M subsidiary data signals.

9. The device according to claim 7, wherein:
said data signal splitting device, said timeslot data output device and said channeling device define a signal path; and
a weighting device is provided in the signal path downstream of said data signal splitting device, said weighting device multiplies each of a plurality of data symbols of one of the subsidiary data signals by a weighting factor.

10. The device according to claim 9, wherein said weighting device selects a weighting factor based on a TDMA frame structure.

* * * * *